US010271264B2

(12) United States Patent
Patwardhan et al.

(10) Patent No.: US 10,271,264 B2
(45) Date of Patent: Apr. 23, 2019

(54) IDENTIFYING AS ACCESS POINT OPERATING ON A PARTICULAR WIRELESS COMMUNICATION CHANNEL THAT FAILS TO DETECT A PARTICULAR RADAR EVENT

(71) Applicant: Hewlett Packard Enterprise Development LP, Houston, TX (US)

(72) Inventors: Gaurav Patwardhan, Santa Clara, CA (US); Kiran Ashokan, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 63 days.

(21) Appl. No.: 15/692,696

(22) Filed: Aug. 31, 2017

(65) Prior Publication Data

US 2019/0069216 A1   Feb. 28, 2019

(51) Int. Cl.
| | |
|---|---|
| *H04W 48/02* | (2009.01) |
| *H04W 48/16* | (2009.01) |
| *H04W 48/20* | (2009.01) |
| *H04W 36/08* | (2009.01) |
| *H04W 36/16* | (2009.01) |
| *H04W 36/24* | (2009.01) |
| *H04W 36/38* | (2009.01) |
| *H04W 72/04* | (2009.01) |
| *H04W 84/12* | (2009.01) |
| *H04W 88/08* | (2009.01) |
| *H04W 16/14* | (2009.01) |
| *H04W 64/00* | (2009.01) |

(52) U.S. Cl.
CPC .......... *H04W 48/02* (2013.01); *H04W 64/003* (2013.01); *H04W 72/0453* (2013.01); *H04W 84/12* (2013.01)

(58) Field of Classification Search
CPC ..... H04W 16/14; H04W 84/12; H04W 24/08; H04W 36/06; H04W 72/085; H04W 88/08; H04W 48/00; H04W 48/02; H04W 48/20; H04B 17/00; G01S 7/023
See application file for complete search history.

(56) References Cited

U.S. PATENT DOCUMENTS

| | | |
|---|---|---|
| 7,129,884 B1 | 10/2006 | Tehrani et al. |
| 8,400,938 B2 | 3/2013 | Matsuura et al. |

(Continued)

OTHER PUBLICATIONS

Cisco, Wi-Fi Location-Based Services 4.1 Design Guide, Jan. 30, 2014, 68 Pgs.

*Primary Examiner* — Ahmed Elallam
(74) *Attorney, Agent, or Firm* — Hewlett Packard Enterprise Patent Department (57) ABSTRACT

Example method includes: receiving, by a network device, a plurality of notifications from a plurality of access points in a wireless local area network (WLAN), each notification indicating detection of a particular radar event on a particular wireless communication channel; identifying, by the network device, at least one access point operating on the particular wireless communication channel beside the plurality of access points that fails to detect the particular radar event; and transmitting, by the network device, instructions to the at least one access point, wherein the instructions cause the at least one access point to switch to operate on a different wireless communication channel.

20 Claims, 4 Drawing Sheets

(56) References Cited

U.S. PATENT DOCUMENTS

| | | | |
|---|---|---|---|
| 9,622,089 B1* | 4/2017 | Ngo | H04W 16/14 |
| 9,736,845 B1* | 8/2017 | Yi | G01S 7/023 |
| 2009/0160696 A1* | 6/2009 | Pare | G01S 7/021 |
| | | | 342/20 |
| 2010/0290414 A1* | 11/2010 | Yamada | H04W 16/14 |
| | | | 370/329 |
| 2015/0088835 A1 | 3/2015 | Davis et al. | |
| 2015/0249990 A1* | 9/2015 | Kadiyala | H04W 72/085 |
| | | | 370/252 |
| 2016/0165617 A1 | 6/2016 | Sakamoto et al. | |
| 2017/0041750 A1* | 2/2017 | Jose | G01S 5/0205 |
| 2017/0041954 A1* | 2/2017 | Tsai | H04W 16/14 |
| 2017/0048728 A1 | 2/2017 | Ngo et al. | |
| 2017/0134899 A1* | 5/2017 | Chan | H04W 64/00 |
| 2017/0318474 A1* | 11/2017 | Farshchian | H04W 16/14 |
| 2018/0007598 A1* | 1/2018 | Lee | H04L 43/10 |

* cited by examiner

IDENTIFYING AS ACCESS POINT OPERATING ON A PARTICULAR WIRELESS COMMUNICATION CHANNEL THAT FAILS TO DETECT A PARTICULAR RADAR EVENT

BACKGROUND

In wireless local area network (WLAN) deployments, radio events, such as, radar events, are detected regularly. However, there often occur false detections of radar events. Sometimes, a radar event is not detected by access points in the WLAN at all. Currently, whenever an access point (AP) in the WLAN detects a radio event, the detecting access point will switch its operating channel to a different channel for a minimum amount of time to comply with IEEE 802.11 standards, whereas other APs that failed to detect the radio event continue operating on the same channel.

BRIEF DESCRIPTION OF THE DRAWINGS

The following detailed description references the drawings, wherein.

DETAILED DESCRIPTION

In some global regions, a WLAN provider ensures that its WLAN equipment does not interfere with radar systems that may be the primary users in a particular wireless communication band (e.g., the 5 GHz band). Dynamic Frequency Selection (DFS) generally refers to a spectrum-sharing mechanism that may allow WLANs to coexist with the radar systems. An AP with DFS enabled can automatically select a frequency that does not interfere with the radar systems while operating in the particular wireless communication band (e.g., the 5 GHz band).

Figure 1:
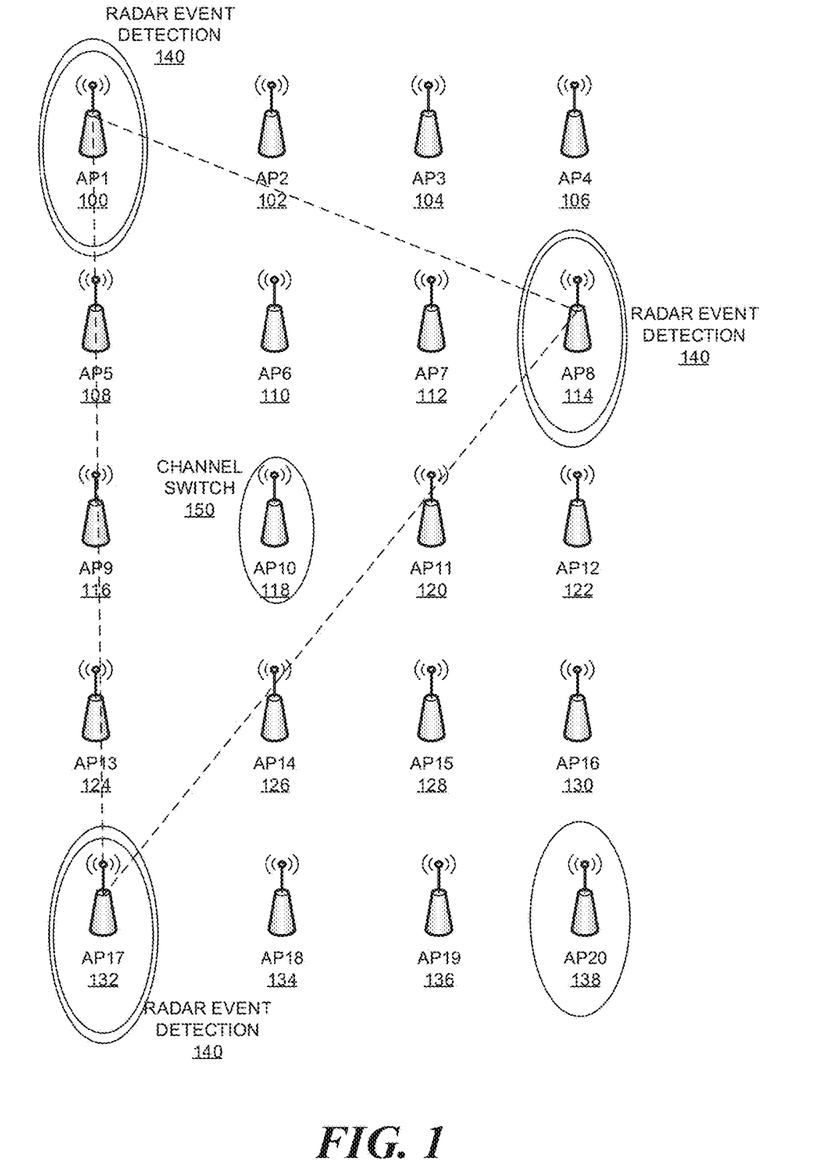
FIG. 1 is a block diagram of an example system deployment for identifying an access point operating on a particular wireless communication channel that fails to detect a particular radar event.

FIG. 1 is a block diagram of an example system deployment for identifying an access point operating on a particular wireless communication channel that fails to detect a particular radar event. FIG. 1 includes a plurality of access points deployed in an example WLAN, including but not limited to, AP1 100, AP2 102, . . . , AP20 138. In this example, each of the plurality of access points AP1 100 to AP20 138 is enabled with the DFS. Therefore, when an AP detects a radar signal in its operating channel, the AP can immediately switch to operate on a different operating channel.

Here, a radar signal may refer to a burst of pulses of a high frequency signal. When one burst is over, another burst may repeat after a period of time, which is known as sweep time. The sweep time can be a result of radars that slowly rotate through 360 degrees, so that in a 30-second sweep period, the AP may receive the radar signal for a fraction of a second. During this short period, the AP may see a few pulses separated by a time interval (e.g., from 250 microseconds to 20 milliseconds), where each pulse may last 2 microseconds or smaller in width.

International Telecommunication Union (ITU) has defined several different types of radar based on different frequencies, the number of pulses in a burst, and pulse repetition frequency within the burst. Table 1 below includes examples of different radar types.

TABLE 1

|  | Pulse Width | PRF (PPS) | Pulses per burst | Pulse Modulation | Bursts per Trial | Success Rate |
| --- | --- | --- | --- | --- | --- | --- |
| Reference | 1 μs | 700 | 18 | None | 1 | N/A |
| Type 1 | 0.5-5 μs | 200-1000 | 10 | None | 1 | >60% |
| Type 2 | 0.5-15 μs | 200-1600 | 15 | None | 1 | >60% |
| Type 3 | 0.5-15 μs | 2300-4000 | 25 | None | 1 | >60% |
| Type 4 | 20-30 μs | 2000-4000 | 20 | Chirp, ±2.5 MHz deviation | 1 | >60% |
| Type 5 | 0.5-2 μs | 300-400 | 10 | None | 2 or 3 | >60% |
| Type 6 | 0.5-2 μs | 400-1200 | 15 | None | 2 or 3 | >60% |

In examples illustrated in FIG. 1, the DFS-enabled APs can search for radar pulses in the frequency channel where it is operating or during a channel scan. Also, the DFS-enabled APs may constantly monitor errors in the received frames and analyzes the timing patterns for periodicity. If a pattern matches a radar signal, the DFS-enabled APs may instruct the WLAN equipment to discontinue operation on that channel as quickly as possible. In addition, the DFS-enabled APs may maintain a non-occupancy list (NOL), which includes the channels where a radar event has been detected. The APs can avoid using these channels for a non-occupancy period (e.g., at least 30 minutes) after detecting the radar event on the channels. Upon receiving the instruction, the WLAN equipment reboots or resets and begins to operate on another frequency after checking that the new frequency is free of radar signals. A channel on the NOL may be purged once the non-occupancy period has elapsed for that channel. In some examples, such radar detection may comply with IEEE 802.11 standards.

Moreover, the example system described in FIG. 1 can proactively change the operating channel of an AP that should have detected a radar signal but fails to detect the radar signal. For example, assuming that AP1 100, AP8 114, AP10 118, AP17 132, and AP20 138 operate on the same wireless communication channel in an enterprise WLAN deployment. As a result, the aforementioned APs can receive signals from each other albeit at a very low signal-noise ratio (SNR). For illustration purposes only, assuming that AP1 100, AP8 114, and AP17 132 detect a radar signal while operating on the same wireless communication channel. However, AP10 118 and AP20 138 fail to detect the radar signal although they operate on the same wireless communication channel.

Upon detecting a radar signal, a DFS-enabled AP in the example system can report to a network controller with a notification message indicating that the AP has detected a radar signal. As such, in the above example, AP1 100, AP8 114, and AP17 132 can report to the network controller that they detect a radar event (or radar signal). The network controller can keep a record of the radar event and the set of APs that detect the same radar event.

In addition, because the deployment location of each AP in the plurality of APs is known to the system, the network controller can perform a convex hull calculation on the APs that have reported radar event detection 140, namely, AP1 100, AP8 114, and AP17 132. In some examples, the convex hull calculation can be run on the subset of APs, which report radar event detection 140 on a particular wireless communication channel within a given time window (e.g., 1-2 mins). Therefore, spurious radar event detections may be removed from the calculation to avoid their impact on the convex hull calculation.

According to the example convex hull calculation in WLAN, a set of access points' locations may be defined to be convex, if they contain the line segments connecting each pair of APs' locations. The convex hull of a given set X of access points (e.g., AP1 100, AP8 114, and AP17 132) may be defined as: (1) the minimal convex set containing X; (2) the intersection of convex sets containing X; (3) the set of convex combinations of points in X; (4) the union of simplices with vertices in X. Simplices may refer to any triangle or tetrahedron to any dimensions. Here, the intersection of convex sets containing X can include a subset of every other convex set Y that contains X, because Y is included among the sets being intersected. Thus, the minimal convex set containing X is unique. Moreover, each convex set containing X also contain convex combinations of points in X, so that the set of convex combinations is contained in the intersection of convex sets containing X. Conversely, the set of convex combinations is a convex set containing X, so that it also contains the intersection of convex sets containing X. Therefore, the sets given by these two definitions are equal. Therefore, the convex hull of a set X of three or more access points in the WLAN is the union of the triangles determined by triples of access points selected from X.

In the example illustrated in FIG. 1, since AP10 118 is located inside the convex hull and operating on the same wireless communication channel, the network controller can determine that AP10 118 should have detected the radar event. Furthermore, the network controller can infer that AP10 118 is likely to detect the radar event when the burst of pulses repeat itself after a short period of time, if AP10 118 continues operating on the same wireless communication channel. Therefore, the network controller can proactively instruct AP10 118 to switch its wireless operating channel to a different wireless operating channel that is not a part of the non-occupation list (NOL).

Note that because AP10 118 has not detected the radar event, AP10 118 may not switch to the different wireless operating channel immediate upon receiving the instruction from the network controller. In some examples, AP10 118 may determine whether at least one client device is associated with AP10 118 upon receiving the instruction to switch to the different wireless operating channel from the network controller. If so, AP10 118 may guide the at least one client device to associate with a different access point in the WLAN before switching to the different wireless operating channel. For example, AP10 118 can transmit a disassociation message or de-authentication message to the at least one client device that is associated with AP10 118.

In some examples, the network controller may guide the at least one client device to switch to the different wireless operating channel. Specifically, the network controller may assign the at least one client device to a different AP in the WLAN based on a variety of factors, including but not limited to, client loads of the APs in the WLAN, channel conditions on various wireless operating channels, capabilities of the at least one client device, etc. In this example, after assigning the at least one client device to the different AP, the network controller may: (1) instruct AP10 118 to deauthenticate the at least one client device; (2) instruct the assigned AP to respond to an association request sent by the at least one client device; and (3) instruct all other APs in the WLAN to reject the association request sent by the at least one client device.

In some examples, the network controller may further instruct AP10 118 to reject new association requests from client devices upon determining that AP10 118 is located inside the convex hull boundaries and operates on the same wireless communication channel as other APs in the convex set that have detected the radar event.

In some examples, the network controller may keep track of the number of client devices associated with AP10 118. If the network controller determines that no client device is associated with AP10 118, then the network controller may instruct AP10 118 to switch to operate on the different operating channel. If there are some client devices associated with the AP10 118, then the network controller may wait until the client devices currently associated with AP10 118 get associated with other APs in the WLAN, and then instruct AP10 118 to switch to operate on the different operating channel.

On the other hand, in case of AP20 138, because AP20 138 is located outside the convex hull, the network controller has no basis to determine whether the radar event should have been detected by AP20 138. Nevertheless, the network controller can take some further actions to proactively switch a wireless operating channel of an AP outside the convex hull that does not detect the radar event (e.g., AP20 138). For example, the network controller may increase the scanning probability, such that the monitoring APs located closer to AP20 can scan the wireless communication channel, on which AP1 100, AP8 114, and AP17 132 detect the radar events, more frequently. If a subsequent radar event is detected upon increasing the scanning probability, then AP20 138 can switch to operate on a different wireless communication channel. Therefore, by selectively using a greater number of APs as channel monitors, the example system can reliably detect radar events. Meanwhile, the example system can also help improve client connectivity and allow the APs in the WLAN to be better compliant with the Federal Communications Commission (FCC) standards.

Figure 2:
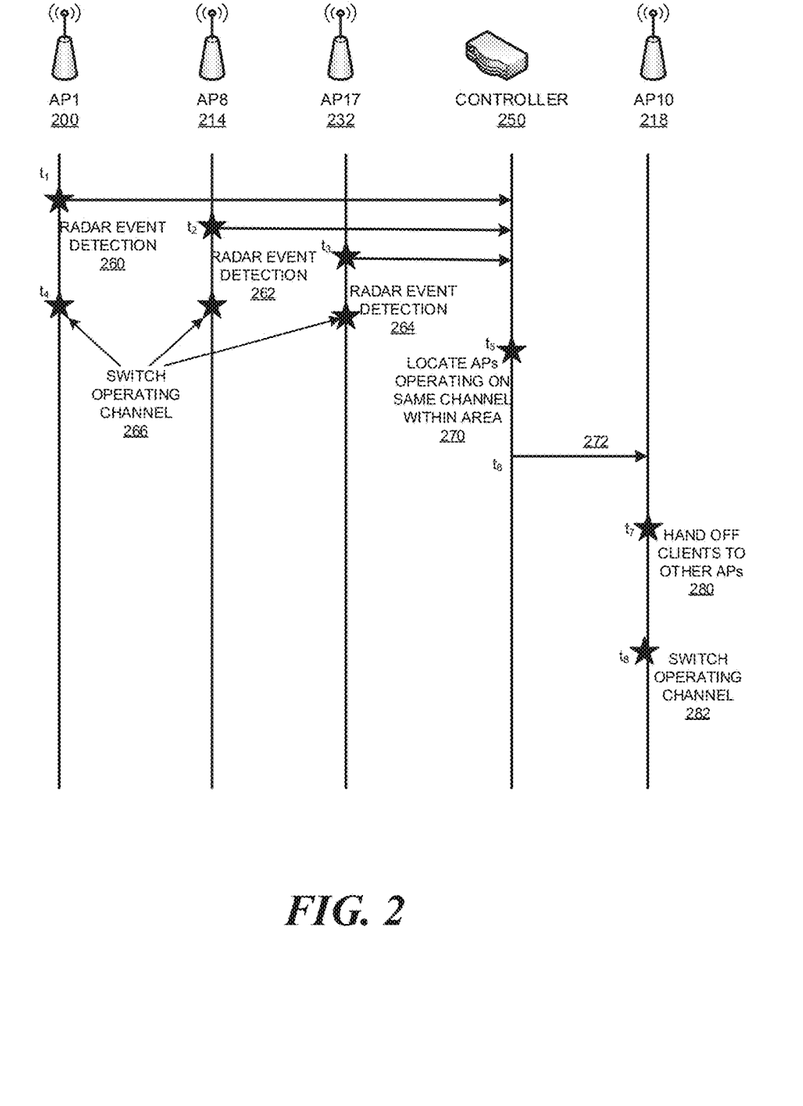
FIG. 2 is a sequence diagram illustrating example intent-based graphical communication sequences for identifying an access point operating on a particular wireless communication channel that fails to detect a particular radar event.

FIG. 2 is a sequence diagram illustrating example intent-based graphical communication sequences for identifying an access point operating on a particular wireless communication channel that fails to detect a particular radar event. FIG. 2 includes a network controller 250 and a plurality of access points, including for example, AP1 200, AP8 214, AP17 232, AP10 218, etc. Assuming that AP1 200, AP8 214, AP17 232, AP10 218 are operating on the same wireless communication channel and similarly deployed in the WLAN as their corresponding APs in FIG. 1. In this example, at time point $t_1$, AP1 200 reports a radar event detection 260 to network controller 250. Subsequently, at time point $t_2$, AP8 214 reports a radar event detection 262 to network controller 250. Thereafter, at time point $t_3$, AP17 232 reports a radar event detection 264 to network controller 250. Because AP1 200, AP8 214 and AP17 232 are enabled with DFS, after the radar event detection, each of AP1 200, AP8 214 and AP17 232 can switch its operating channel 266 at time point $t_4$. For these APs, time point $t_4$ is shown to be the same in FIG. 2 for illustration purposes only. In other examples, time point $t_4$ may be different for different APs.

After network controller 250 receives the reports (e.g., notification messages) from AP1 200, AP8 214 and AP17 232, network controller 250 determines at least (1) a timestamp indicating a particular time at which each AP detects the radar signal, and (2) radar event type corresponding to each report of radar event detection. If the radar event types identified from the reports from AP1 200, AP8 214 and AP17 232 belong to the same type, and if the timestamps in the reports indicate that AP1 200, AP8 214 and AP17 232 receive the radar signal within the same time window, network controller 250 may determine that AP1 200, AP8 214 and AP17 232 that are operating on the same wireless communication channel has detected the same radar event.

Next, at time point $t_5$, network controller 250 can locate a subset of APs operating on the same wireless communication channel within the area 270. Here, network controller 250 may perform a convex hull calculation on the finite set of APs that have reported the radar event detection, which includes AP1 200, AP8 214, and AP17 232 in this example. Further, network controller 250 may determine that AP10 218 is operating on the same wireless communication channel as the finite set of APs and located within the convex hull area. Therefore, at time point $t_6$, network controller may transmit instructions 272 to AP10 218 so that AP10 218 can switch to a different wireless operating channel that is not on the non-occupancy list.

Specifically, instruction 272 may include instructions to de-authenticate client devices that are currently associated with AP10 218, instructions to reject any new association requests that AP10 218 subsequently receives, and instructions to switch AP10 218's operating channel to a different wireless communication channel after its current client devices have been disassociated or de-authenticated, etc.

In the example illustrated in FIG. 2, assuming that AP10 218 hands off its associated client devices to other APs 280 at time point $t_7$. At time point $t_8$, AP10 218 can switch its operating channel 282 to the different wireless communication channel, because no client device is associated with AP10 218. Further, AP10 218 may choose to return to its previous operating channel after the non-occupancy period has elapsed and the previous operating channel is no longer on the non-occupancy list.

Figure 3:
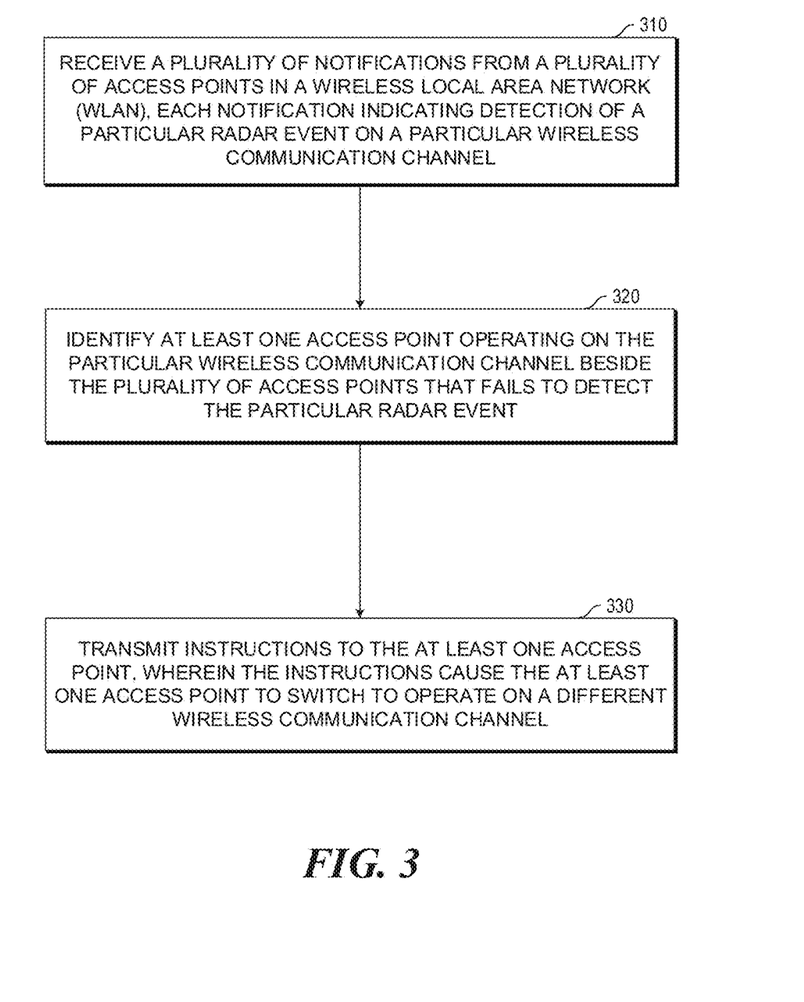
FIG. 3 is a flowchart of an example process of identifying an access point operating on a particular wireless communication channel that fails to detect a particular radar event.

Processes of Identifying an Access Point Operating on a Particular Wireless Communication Channel that Fails to Detect a Particular Radar Event FIG. 3 is a flowchart of an example process of identifying an access point operating on a particular wireless communication channel that fails to detect a particular radar event. During operations, a network device (such as, the access point) can receive a plurality of notifications from a plurality of access points in a wireless local area network (WLAN), whereas each notification can indicate detection of a particular radar event on a particular wireless communication channel (operation 310). Next, the network device can identify at least one access point operating on the particular wireless communication channel beside the plurality of access points that fails to detect the particular radar event (operation 320). Further, the network device can transmit instructions to the at least one access point, wherein the instructions cause the at least one access point to switch to operate on a different wireless communication channel (operation 330).

In some examples, the plurality of access points can operate on the particular wireless communication channel. Moreover, the plurality of access points may include at least three access points in the WLAN. In some examples, the plurality of notifications can be received within a threshold period of time.

In some examples, the network device can identify the at least one access point by: performing a convex hull calculation on the plurality of access points from which the plurality of notifications are received; and determining that the at least one access point is located inside the convex hull and operates on the particular wireless communication channel.

Furthermore, the network device can determine that at least one client device is associated with the at least one access point. Then, the network device can guide the at least one client device to associate with a different access point in the WLAN.

In some examples, the network device can instruct the at least one access point to reject new association requests from client devices if the network device determines that the at least one access point is located inside the convex hull and operates on the particular wireless communication channel.

In some examples, the network device may instruct the at least one access point to switch to operate on the different wireless communication channel if the network device determines that no client device is associated with the at least one access point.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Figure 4:
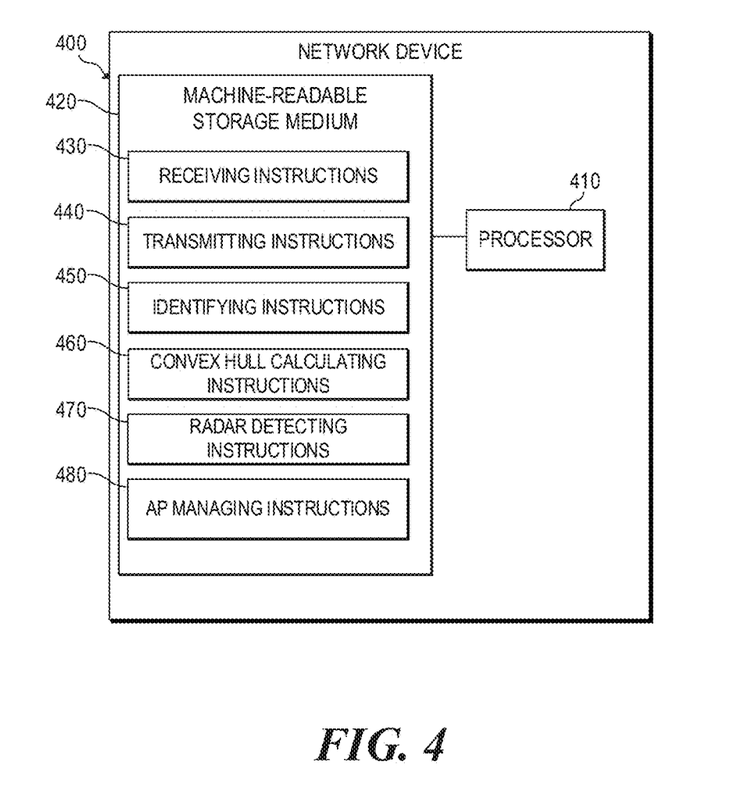
FIG. 4 is a block diagram of an example network device to identify an access point operating on a particular wireless communication channel that fails to detect a particular radar event.

Network Device to Identify an Access Point Operating on a Particular Wireless Communication Channel that Fails to Detect a Particular Radar Event FIG. 4 is a block diagram of an example network device to identify an access point operating on a particular wireless communication channel that fails to detect a particular radar event.

As used herein, a network device may be implemented, at least in part, by a combination of hardware and programming. For example, the hardware may comprise at least one processor (e.g., processor 410) and the programming may comprise instructions, executable by the processor(s), stored on at least one machine-readable storage medium (e.g., 420). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 410 may fetch, decode, and execute instructions stored on storage medium 420 to perform the functionalities described below in relation to receiving instructions 430, transmitting instructions 440, identifying instructions 450, convex hull calculating instructions 460, radar detecting instructions 470, and AP managing instructions 480. In other examples, the functionalities of any of the instructions of storage medium 420 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 4, storage medium 420 may be implemented by one machine-readable storage medium, or multiple machine-readable storage media.

Although network device 400 includes at least one processor 410 and machine-readable storage medium 420, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 430-480 may be executed by processor 410 to: receive a plurality of notifications from a plurality of access points in a wireless local area network (WLAN) indicating detection of a particular radar event on a first wireless communication channel that the plurality of access points operate on; identify at least one access point operating on the particular wireless communication channel that fails to notify the network device of the particular radar event; perform a convex hull calculation on the plurality of access points from which the plurality of notifications are received; determine that the at least one access point is located inside the convex hull and operates on the particular wireless communication channel; determine that at least one client device is associated with the at least one access point; guide the at least one client device to associate with a different access point in the WLAN; instruct the at least one access point to reject new association requests from client devices in response to determining that the at least one access point is located inside the convex hull and operates on the particular wireless communication channel; instruct the at least one access point to switch its operating channel to a second wireless communication channel, wherein the second wireless communication channel is different than the first wireless communication channel; instruct the at least one access point to switch its operating channel in response to determining that no client device is associated with the at least one access point; etc.

We claim:

1. A method comprising:
   receiving, by a network device, a plurality of notifications from a plurality of access points in a wireless local area network (WLAN), each notification indicating detection of a particular radar event on a particular wireless communication channel;
   identifying, by the network device, at least one access point operating on the particular wireless communication channel beside the plurality of access points that fails to detect the particular radar event; and
   transmitting, by the network device, instructions to the at least one access point, wherein the instructions cause the at least one access point to switch to operate on a different wireless communication channel.

2. The method of claim 1, wherein the plurality of access points operate on the particular wireless communication channel.

3. The method of claim 1, wherein the plurality of access points comprise at least three access points in the WLAN.

4. The method of claim 1, wherein the plurality of notifications are received within a threshold period of time.

5. The method of claim 1, wherein identifying the at least one access point further comprises:
   performing a convex hull calculation on the plurality of access points from which the plurality of notifications are received; and
   determining that the at least one access point is located inside the convex hull and operates on the particular wireless communication channel.

6. The method of claim 5, further comprising:
   determining that at least one client device is associated with the at least one access point;
   guiding the at least one client device to associate with a different access point in the WLAN.

7. The method of claim 5, further comprising:
   instructing the at least one access point to reject new association requests from client devices in response to determining that the at least one access point is located inside the convex hull and operates on the particular wireless communication channel.

8. The method of claim 5, further comprising:
   instructing the at least one access point to switch to operate on the different wireless communication channel in response to determining that no client device is associated with the at least one access point.

9. A network device, comprising at least:
   a memory;

a processor executing instructions from the memory to:
receive a plurality of notifications from a plurality of access points in a wireless local area network (WLAN) indicating detection of a particular radar event on a first wireless communication channel that the plurality of access points operate on;
identify at least one access point operating on the particular wireless communication channel that fails to notify the network device of the particular radar event; and
instruct the at least one access point to switch its operating channel to a second wireless communication channel, wherein the second wireless communication channel is different than the first wireless communication channel.

10. The network device of claim 9, wherein the radar event comprises a burst of pulses of a high frequency signal received on the particular wireless communication channel.

11. The network device of claim 9, wherein the plurality of access points switch to a third wireless communication channel in response to detecting the particular radar event according to a dynamic frequency selection (DFS) mechanism.

12. The network device of claim 9, wherein the plurality of access points detect the particular radar event within a threshold period of time.

13. The network device of claim 9, wherein the processor further executes instructions from the memory to:
perform a convex hull calculation on the plurality of access points from which the plurality of notifications are received; and
determine that the at least one access point is located inside the convex hull and operates on the particular wireless communication channel.

14. The network device of claim 9, wherein the processor further executes instructions from the memory to:
instruct the at least one access point to reject new association requests from client devices in response to determining that the at least one access point is located inside the convex hull and operates on the particular wireless communication channel.

15. The network device of claim 14, wherein the processor further executes instructions from the memory to:
determine that at least one client device is associated with the at least one access point; and
guide the at least one client device to associate with a different access point in the WLAN.

16. The network device of claim 15, wherein the processor further executes instructions from the memory to:
instruct the at least one access point to switch its operating channel in response to determining that no client device is associated with the at least one access point.

17. A non-transitory machine-readable storage medium encoded with instructions executable by at least one processor of a network device, the machine-readable storage medium comprising instructions to:
receive a plurality of notifications from a plurality of access points in a wireless local area network (WLAN) indicating detection of a particular radar event on a first wireless communication channel;
identify at least one access point operating on the particular wireless communication channel that fails to notify the network device of the particular radar event;
determine whether no client device is associated with the at least one access point; and
instruct the at least one access point to switch its operating channel to a second and different wireless communication channel in response to no client device being associated with the at least one access point.

18. The non-transitory machine-readable storage medium of claim 17, wherein the machine-readable storage medium further comprises instructions to:
perform a convex hull calculation on the plurality of access points from which the plurality of notifications are received; and
determine that the at least one access point is located inside the convex hull and operates on the particular wireless communication channel.

19. The non-transitory machine-readable storage medium of claim 17, wherein the machine-readable storage medium further comprises instructions to:
determine that the at least one access point is located inside the convex hull;
determine that the at least one access point operates on the particular wireless communication channel; and
inferring that the at least one access point should have detected the particular radar event but fails to detect the particular radar event.

20. The non-transitory machine-readable storage medium of claim 17, wherein the machine-readable storage medium further comprises instructions to:
instruct the at least one access point to reject new association requests from client devices; and
guide the at least one client device to associate with a different access point in the WLAN in response to determining that at least one client device is associated with the at least one access point.

* * * * *